United States Patent
Jacobsen et al.

(10) Patent No.: US 9,109,578 B2
(45) Date of Patent: Aug. 18, 2015

(54) ROOT EXTENDER FOR A WIND TURBINE ROTOR BLADE

(75) Inventors: Eric Morgan Jacobsen, Greenville, SC (US); Bart Jan Veldkamp, Enschede (NL)

(73) Assignee: General Electric Company, Schenetady, NY (US)

( * ) Notice: Subject to any disclaimer, the term of this patent is extended or adjusted under 35 U.S.C. 154(b) by 587 days.

(21) Appl. No.: 13/494,251

(22) Filed: Jun. 12, 2012

(65) Prior Publication Data
US 2013/0330194 A1    Dec. 12, 2013

(51) Int. Cl.
F04D 29/34 (2006.01)
F03D 1/06 (2006.01)
F03D 11/00 (2006.01)

(52) U.S. Cl.
CPC .............. F03D 1/06 (2013.01); F03D 1/0658 (2013.01); F03D 11/00 (2013.01); Y02E 10/721 (2013.01)

(58) Field of Classification Search
CPC ......... F03D 1/0658; F03D 1/065; F03D 1/06; F03D 11/00; Y02E 10/721
USPC ........................ 415/4.2, 129; 416/246, 204 R
See application file for complete search history.

(56) References Cited

U.S. PATENT DOCUMENTS

| | | | |
|---|---|---|---|
| 7,381,029 B2 | 6/2008 | Moroz | |
| 7,780,417 B2 | 8/2010 | Kirchner et al. | |
| 8,267,651 B2 * | 9/2012 | Sorensen | 416/1 |
| 2006/0099076 A1 | 5/2006 | Wobben | |
| 2008/0191488 A1 | 8/2008 | Kirchner et al. | |
| 2009/0148291 A1 | 6/2009 | Gerber et al. | |
| 2009/0304513 A1 | 12/2009 | Jacobsen et al. | |
| 2009/0317256 A1 | 12/2009 | Quell | |
| 2010/0092288 A1 | 4/2010 | Sorensen | |
| 2010/0098552 A1 | 4/2010 | Aarhus | |
| 2010/0290912 A1 | 11/2010 | Sorensen | |
| 2011/0142636 A1 | 6/2011 | Curtin | |

FOREIGN PATENT DOCUMENTS

| | | |
|---|---|---|
| DE | 3922199 | 7/1990 |
| EP | 2108819 | 10/2009 |
| EP | 2362091 | 8/2011 |
| FR | 2863318 | 6/2005 |
| GB | 2076064 | 11/1981 |
| WO | WO 99/14490 | 3/1999 |
| WO | WO 01/42647 | 6/2001 |
| WO | WO 03/060319 | 7/2003 |
| WO | WO 2004/061298 | 7/2004 |
| WO | WO 2009/085041 | 7/2009 |
| WO | WO 2010/067082 | 6/2010 |
| WO | WO 2011/134810 | 11/2011 |

* cited by examiner

*Primary Examiner* — Dwayne J White
*Assistant Examiner* — Jason Fountain
(74) *Attorney, Agent, or Firm* — Dority & Manning, P.A.

(57) ABSTRACT

A root extender for coupling a rotor blade to a hub of a wind turbine is disclosed. The root extender may generally include a body defining a longitudinal axis between a first end and a second end. The first end may define a first planar surface configured to be positioned adjacent to the hub and the second end may define a second planar surface configured to be positioned adjacent to the rotor blade. The second planar surface may be oriented at a cone angle relative to the first planar surface. In addition, the longitudinal axis may be oriented at a non-perpendicular angle relative to the first planar surface.

15 Claims, 6 Drawing Sheets

FIG. -1-

PRIOR ART

ROOT EXTENDER FOR A WIND TURBINE ROTOR BLADE

FIELD OF THE INVENTION

The present subject matter relates generally to a root extender for a wind turbine rotor blade that increases the blade's effective length and also increases the blade's tower clearance. In particular, the present subject matter relates to a root extender and/or a rotor blade configuration that provides such advantages without shifting the center of gravity of the rotor blade away from its pitch axis.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from the wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length and surface area of the rotor blades. However, the magnitude of deflection forces and loading of a rotor blade is generally a function of blade length, along with wind speed, turbine operating states, blade stiffness, and other variables. This increased loading not only produces fatigue on the rotor blades and other wind turbine components but may also increase the risk of a sudden catastrophic failure of the rotor blades, for example, when excess loading causes deflection of a blade resulting in a tower strike.

Figure 1:
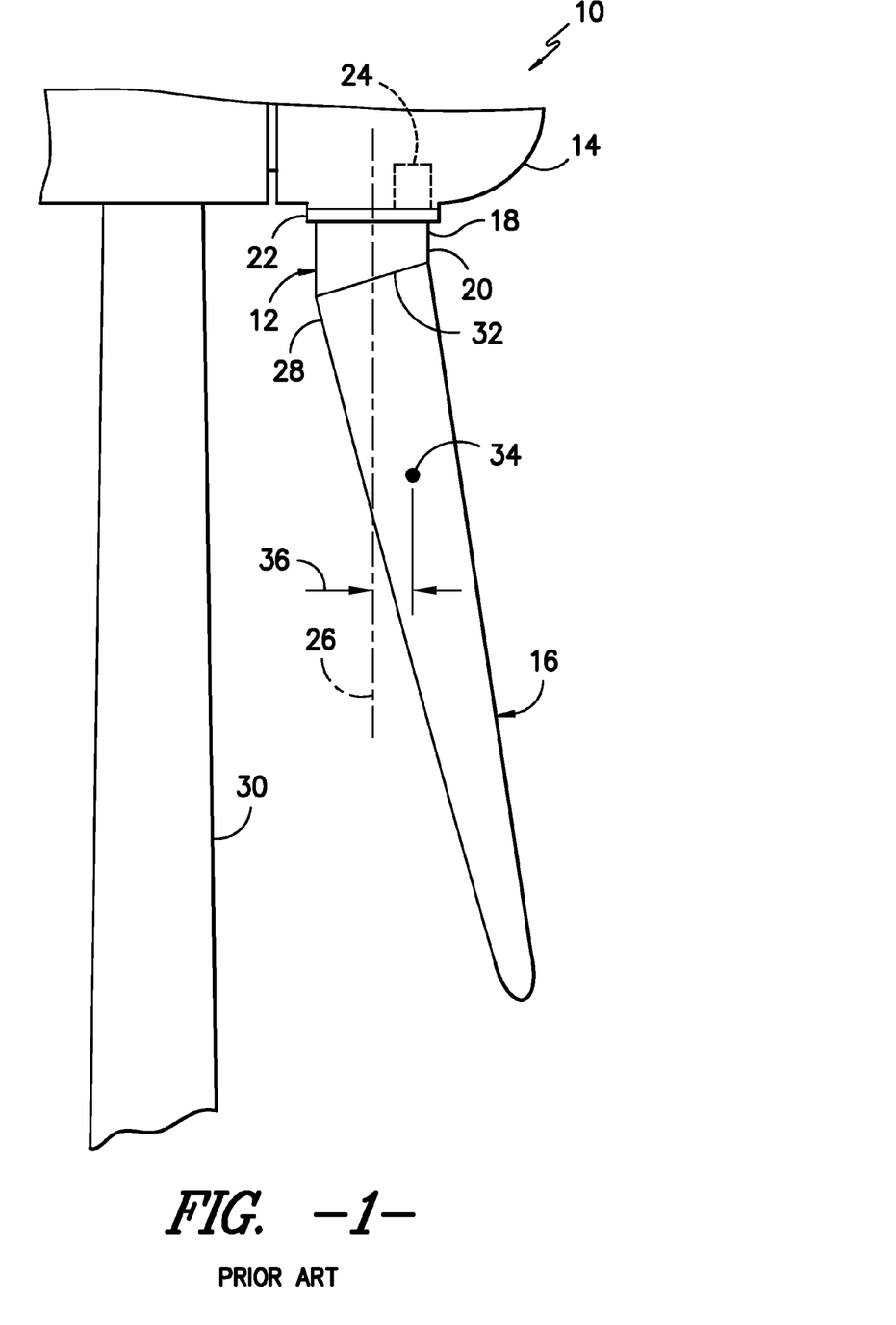
FIG. 1 illustrates a partial, side view of a wind turbine having a conventional root extender installed between a hub and one of the rotor blades of the wind turbine.

To increase the effective length of a rotor blade without increasing the likelihood of a tower strike occurring, root extenders have been developed that include an angled surface at the interface defined between the root extender and the rotor blade, thereby allowing the blade to be angled away from the wind turbine tower. For example, FIG. 1 illustrates a partial, side view of a wind turbine 10 having a conventional root extender 12 installed between a hub 14 and a rotor blade 16 of the wind turbine 10. As shown, the root extender 12 generally extends between a first end 18 and a second end 20. The first end 18 of the root extender 12 is coupled to the hub 14 via a pitch bearing 22. As is generally understood, a pitch drive 24 may be housed within the hub 14 and may be configured to engage the pitch bearing 22, thereby allowing the rotor blade 16 (and the root extender 12) to be rotated relative to the hub 14 about a pitch axis 26. Additionally, the second end 20 of the root extender 12 is coupled to a blade root 28 of the rotor blade 16. As shown in FIG. 1, to increase the clearance between the rotor blade 16 and a tower 30 of the wind turbine 10, the second end 20 of the root extender 12 defines a mounting surface 32 that is angled away from the tower 30. As a result, when the blade root 28 is coupled to the second end 20 of the root extender 12, the rotor blade 16 extends lengthwise generally perpendicular to the angled mounting surface 32, thereby angling the rotor blade 16 away from the tower 30.

However, by utilizing such a conventional root extender 12, a center of gravity 34 of the rotor blade 16 is shifted away from the pitch axis 26. Specifically, as shown in FIG. 1, while the root extender 12 provides a means for angling the rotor blade 16 away from the tower 30, it also results in the center of gravity 34 of the rotor blade 16 being offset from the pitch axis 26 by a displacement distance 36. Such displacement of the center of gravity 34 typically results in increased loads on the pitch drive(s) 24 and/or pitch bearing(s) 22 of the wind turbine 10, which can lead to decreased pitching capabilities and/or damage to various components of the wind turbine.

Accordingly, a root extender and/or a rotor blade configuration that allows a rotor blade to be angled away from a wind turbine tower without shifting the blade's center of gravity away from the pitch axis would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a root extender for coupling a rotor blade to a hub of a wind turbine. The root extender may generally include a body defining a longitudinal axis between a first end and a second end. The first end may define a first planar surface configured to be positioned adjacent to the hub and the second end may define a second planar surface configured to be positioned adjacent to the rotor blade. The second planar surface may be oriented at a cone angle relative to the first planar surface. In addition, the longitudinal axis may be oriented at a non-perpendicular angle relative to the first planar surface.

In another aspect, the present subject matter discloses a wind turbine including a tower, a nacelle mounted on the tower and a rotor coupled to the nacelle. The rotor may include a hub and a rotor blade rotatable about a pitch axis. In addition, the wind turbine may include a root extender coupled between the hub and the rotor blade. The root extender may define a longitudinal axis between a first end and a second end. The first end may define a first planar surface positioned adjacent to the hub and the second end may define a second planar surface positioned adjacent to the rotor blade. The second planar surface may be oriented at a cone angle relative to the first planar surface. In addition, the longitudinal axis of the root extender may be oriented at a non-perpendicular angle relative to the first planar surface.

In a further aspect, the present subject matter discloses a wind turbine including a tower, a nacelle mounted on the tower and a rotor coupled to the nacelle. The rotor may include a hub and a rotor blade rotatable about a pitch axis. In addition, the wind turbine may include a root extender extending between a first end coupled to the hub and a second end coupled to the rotor blade. The first end may define a first planar surface and the second end may define a second planar surface. The second planar surface may be oriented at a cone angle relative to the first planar surface. In addition, the rotor blade may extend from the root extender such that a center of gravity of the rotor blade is aligned with the pitch axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a root extender and/or a rotor blade configuration that provides for an increase in both a rotor blade's effective length and tower clearance without shifting the blade's center of gravity away from its pitch axis. For example, in several embodiments, a root extender is disclosed that may be coupled between the hub and one of the rotor blades of a wind turbine. The end of the root extender that is configured to be coupled to the rotor blade may be coned or otherwise angled such that the rotor blade is angled away from the tower. In addition, the root extender may be displaced along its length in a direction towards the tower, thereby aligning the blade's center of gravity with its pitch axis. Moreover, in other embodiments, a rotor blade configuration is disclosed in which a pitch bearing of the wind turbine is coupled between a coned root extender and one of the rotor blades of the turbine. As a result, the coned root extender may allow for the rotor blade to be angled away from the tower. In addition, by positioning the pitch bearing at the interface defined between the root extender and the rotor blade, the center of gravity of the rotor blade may aligned with its pitch axis.

Figure 2:
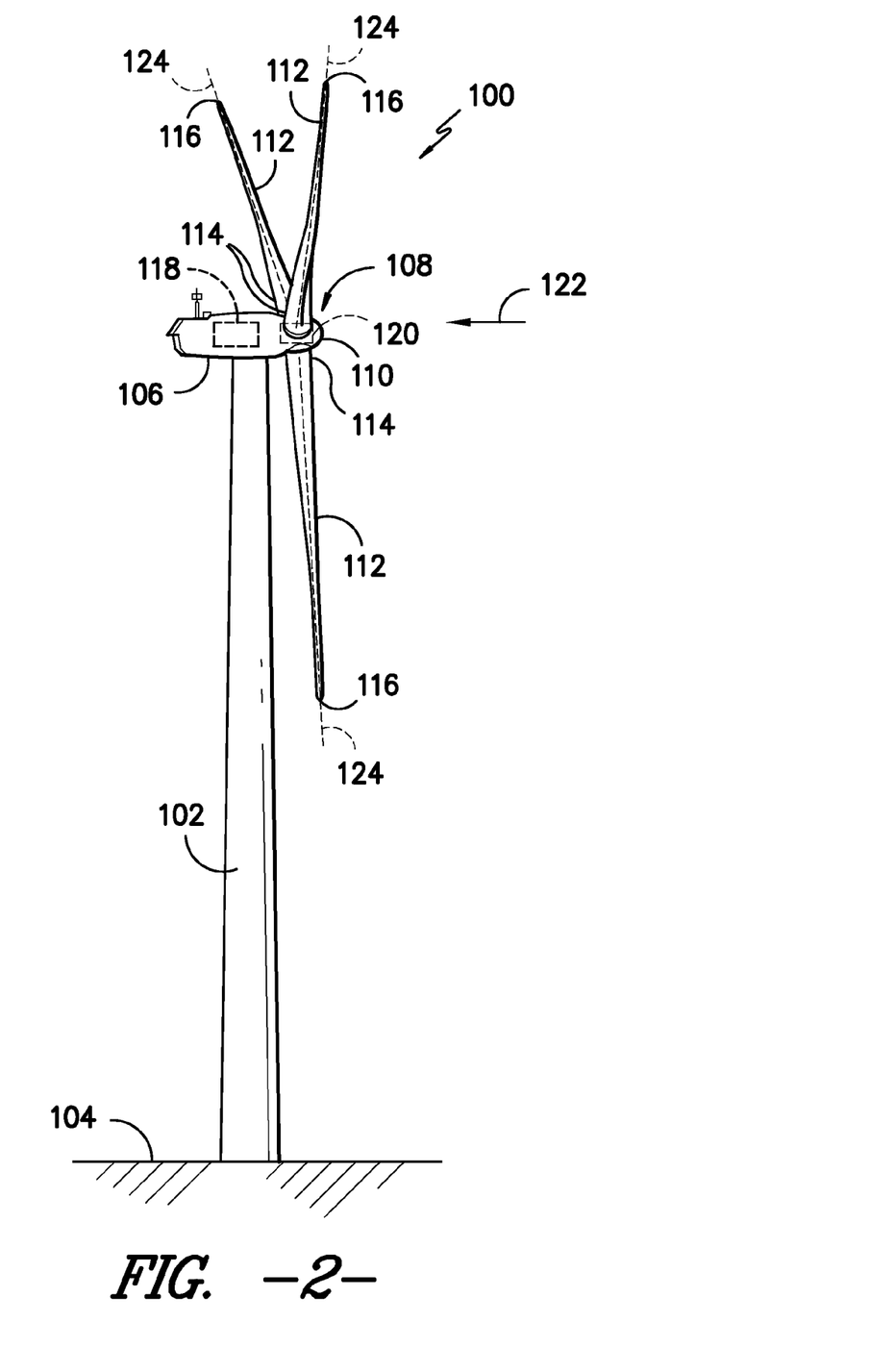
FIG. 2 illustrates a perspective view of one embodiment of a wind turbine.

Referring now to FIG. 2, a perspective view of one embodiment of a wind turbine 100 is illustrated. As shown, the wind turbine 100 includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112.

Each rotor blade 112 may generally extend lengthwise between a blade root 114 coupled to the hub 110 and a blade tip 116 disposed opposite the blade root 114. In addition, each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

It should be appreciated that the rotor blades 112 may general have any suitable configuration known in the art. For example, each rotor blade 112 may be generally straight between the blade root 114 and the blade tip 116 or may be curved between the blade root 114 and the blade tip 116 (e.g., by including pre-bend or by otherwise being curved or bent). Additionally, in one embodiment, each rotor blade 112 may be aeroelastically tailored, such as by being twisted about its longitudinal axis.

In addition, the wind turbine 100 may also include a turbine control system or turbine controller 118 centralized within the nacelle 106. However, it should be appreciated that the turbine controller 118 may be disposed at any location on or in the wind turbine 100, at any location on the support surface 104 or generally at any other location. The turbine controller 118 may generally be configured to control the various operating modes (e.g., start-up or shut-down sequences) and/or the components of the wind turbine 100. For example, the turbine controller 118 may be configured to transmit suitable control signals to a pitch controller 120 mounted within the rotor hub 110 for controlling the blade pitch or pitch angle of each rotor blade 112 (i.e., an angle that determines a perspective of the blade 112 with respect to the direction 122 of the wind). As is generally understood, the pitch angle may be adjusted about a pitch axis 124 of each rotor blade 112 in order to control the loads acting on the blades 112 (i.e., by adjusting an angular position the rotor blades 112 relative to the wind). Thus, in several embodiments, the pitch controller 120 may control the loads acting on the rotor blades 112 by transmitting suitable control signals to a pitch drive 126 (FIGS. 3-6) of each rotor blade 112.

It should be appreciated that the turbine controller 118 and/or the pitch controller 120 may generally comprise a computer and/or any other suitable processing unit. Thus, in several embodiments, the controller(s) 118, 120 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller(s) 118, 120 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller(s) 118, 120 to perform various functions including, but not limited to, transmitting suitable control signals to one or more of the pitch drives 126 (FIG. 3) of the wind turbine 100 in order to adjust the pitch angle of one or more of the rotor blades 112.

Figure 3:
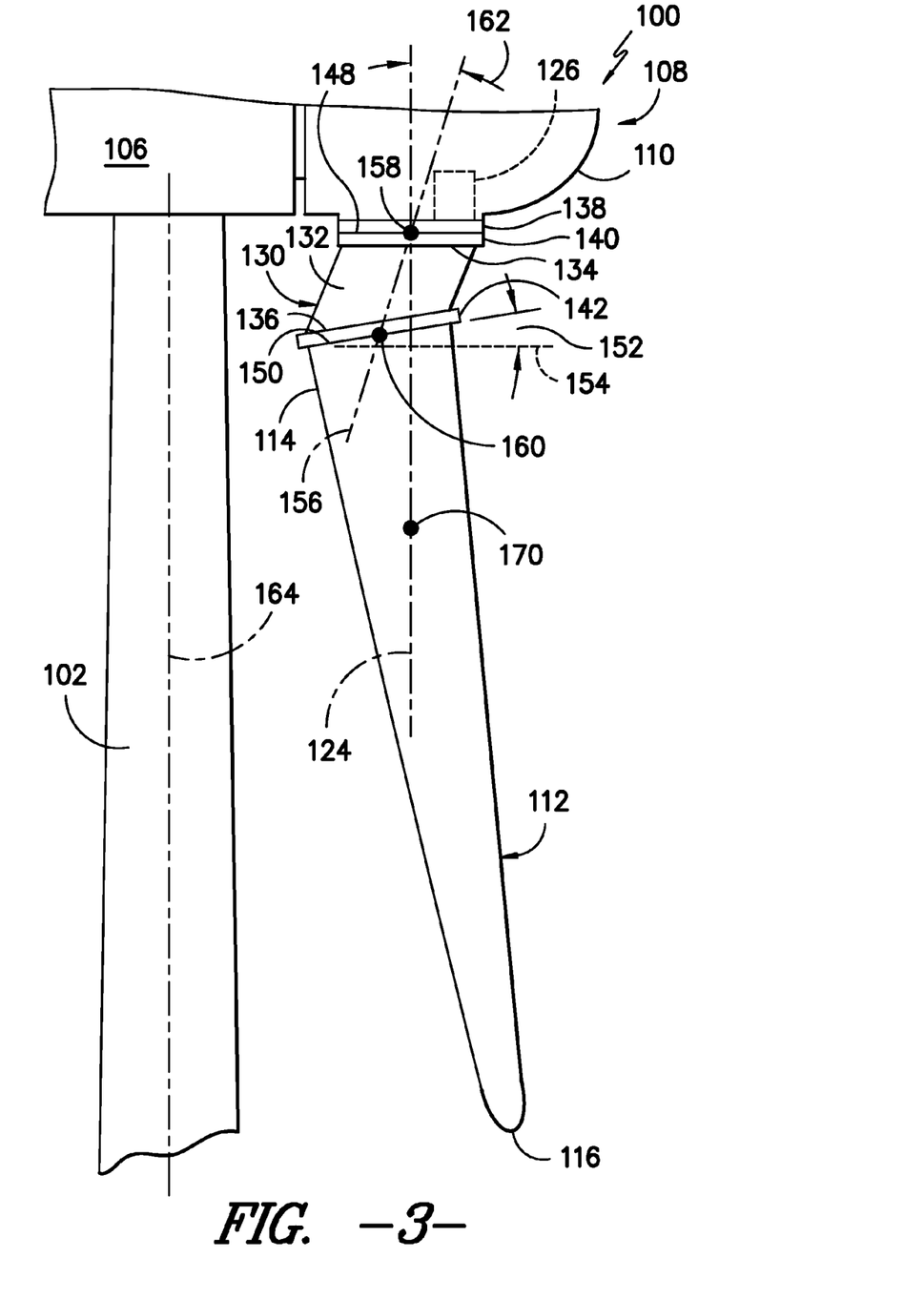
FIG. 3 illustrates a partial, side view of the wind turbine shown in FIG. 2 having one embodiment of a root extender installed between a hub and one of the rotor blades of the wind turbine in accordance with aspects of the present subject matter.
Figure 4:
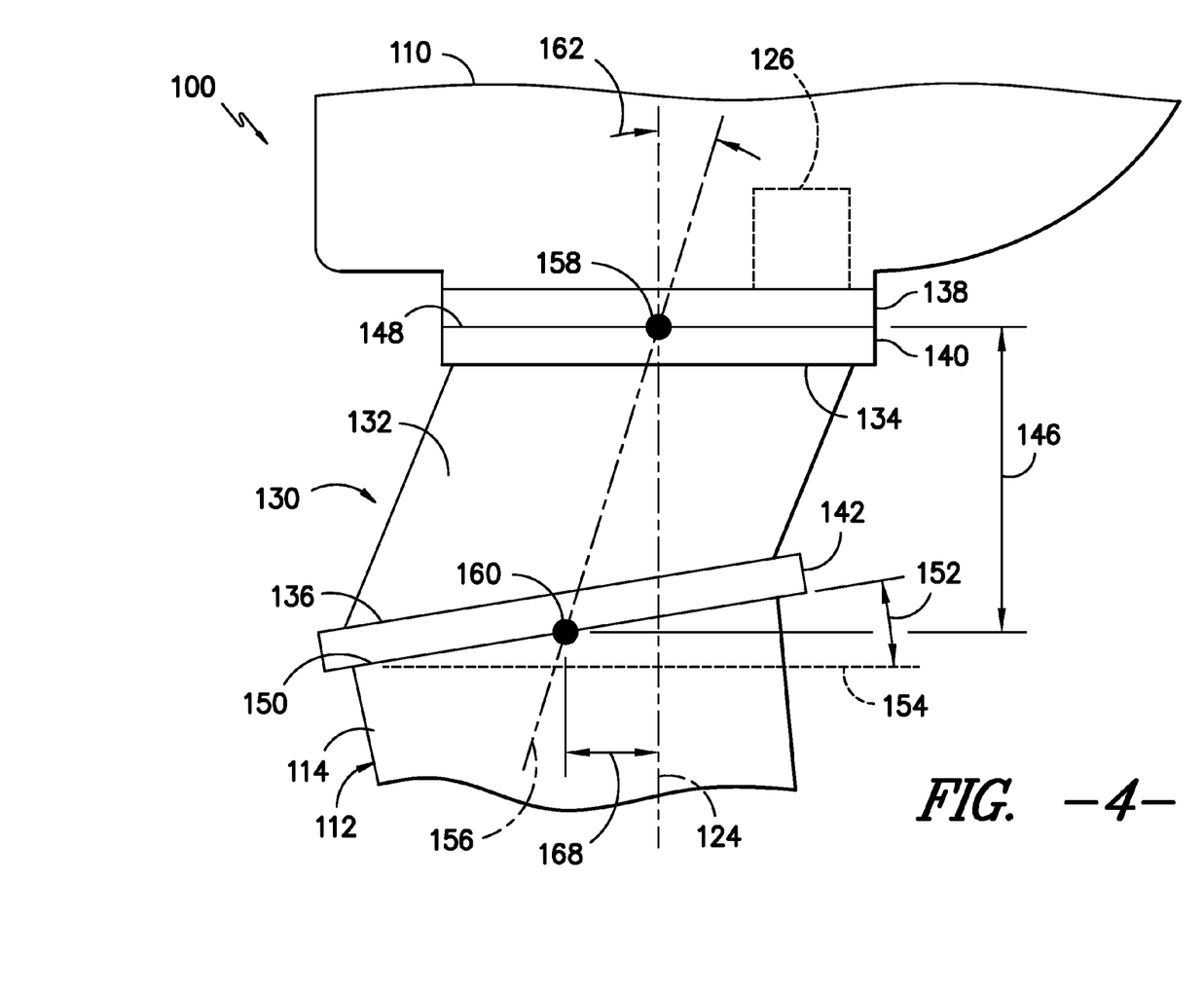
FIG. 4 illustrates a close-up, side view of the root extender shown in FIG. 3.

Referring now to FIGS. 3 and 4, one embodiment of a root extender 130 that may be used to increase the effective length of a rotor blade 112, as well as increase the clearance defined between the blade 112 and a wind turbine tower 102, is illustrated in accordance with aspects of the present subject matter. In particular, FIG. 3 illustrates a partial, side view of the wind turbine 100 shown in FIG. 1 with the disclosed root extender 130 installed between the hub 110 and one of the rotor blades 112 of the wind turbine 102. In addition, FIG. 4 illustrates a close-up view of the root extender 130 shown in FIG. 2.

As shown, the disclosed root extender 130 may generally be configured to be coupled between the hub 110 and one of the rotor blades 112 of the wind turbine 100. Thus, in several embodiments, the root extender 130 may generally comprise a body 132 extending lengthwise between a first end 134 and a second end 136, with the first end 134 being coupled to the hub 110 (e.g., via a pitch bearing 138) and the second end 136 being coupled to the blade root 114. It should be appreciated that the ends 134, 136 of root extender 130 may generally be configured to be coupled to the hub 110 and the rotor blade 112, respectively, using any suitable attachment means and/or method known in the art. For example, as particularly shown in FIG. 4, in one embodiment, the first end 134 of the root extender 130 may include a first flange 140 configured to be mounted to the pitch bearing 138 using suitable mechanical fasteners (e.g., bolts, screws, pins and/or the like) and the second end 136 of the root extender 130 may include a second flange 142 configured to be mounted to the blade root 114 using suitable mechanical fasteners (e.g., bolts, screws, pins and/or the like). In the illustrated embodiment, the flanges 140, 142 are generally configured to extend outwardly from the body 132 of the root extender 130. However, in alternative embodiments, the flanges 140, 142 may be configured as inwardly extending flanges.

By installing a root extender 130 between the hub 110 and the blade root 114 of each rotor blade 112, the overall rotor diameter of the wind turbine 100 may be increased, thereby increasing the wind capturing capability of the wind turbine 100. Thus, it should be appreciated that the root extender 130 may generally define any suitable height 146 between its first and second ends 134, 136 that provides for an increase in the effective length of the corresponding rotor blade 112.

It should also be appreciated that, in several embodiments, the body 132 of the root extender 130 may be designed to have a substantially similar shape and/or configuration as the blade root 114 of each rotor blade 112. For example, the body 132 may define a substantially cylindrical shape and may be configured as a relatively thick and rigid member so as to be capable of withstanding the bending moments and other forces generated during operation of the wind turbine 100.

Additionally, as particularly shown in FIG. 4, in several embodiments, the root extender 130 may define generally planar surfaces 148, 150 at its first and second ends 134, 136. For example, the root extender 130 may define a first planar surface 148 at its first end 134 that is configured to be positioned adjacent to the hub 110 when the first end 134 is coupled to the pitch bearing 138. For instance, the first planar surface 148 may be configured to extend parallel to a planar mounting surface (not shown) of the pitch bearing 138 such that the first planar surface 148 is oriented perpendicular to the pitch axis 124 of the rotor blade 112. Similarly, the root extender 130 may define a second planar surface 150 at its second end 136 that is configured to be positioned adjacent to the rotor blade 112 when the second end 136 is coupled to the blade root 114. For example, the second planar surface 150 may be configured to extend parallel to a planar mounting surface (not shown) of the blade root 114.

In several embodiments, the second planar surface 150 may be coned or otherwise angled relative to the first planar surface 148 in a direction away from the tower 102 of the wind turbine 100. For example, as particularly shown in FIG. 4, a cone angle 152 may be defined between the second planar surface 150 and a reference line 154 extending parallel to the first planar surface 148. As such, when the rotor blade 112 is coupled to the second end 136 of the root extender 130, the rotor blade 112 may be angled away from the tower 102, thereby increasing the amount of clearance defined between the tower 102 and the blade tip 116. It should be appreciated that the cone angle 152 may generally comprise any suitable angle. For example, in several embodiments, the cone angle 152 may be greater than 0 degrees and less than about 10 degrees, such as an angle ranging from about 1 degree to about 9 degrees or from about 2 degrees to about 8 degrees or from about 4 degrees to about 6 degrees and all other subranges therebetween. However, it is foreseeable that, in other embodiments, the cone angle 152 may be greater than about 10 degrees.

Moreover, root extender 130 may also be configured to be angled or displaced between its first and second ends 134, 136. For example, as particularly shown in FIG. 4, the body 132 of the root extender 130 may define a longitudinal axis 156 between a center point 158 of the first planar surface 148 (e.g., at the center of the diameter defined by the first planar surface 148) and a center point 160 of the second planar surface 150 (e.g., at the center of the diameter defined by the second planar surface 150). In such an embodiment, the longitudinal axis 156 may generally be configured to be oriented at a non-perpendicular, displacement angle 162 relative to the first planar surface 148 (i.e., by extending non-parallel to the pitch axis 124 of the rotor blade 112). As such, the center point 160 of the second planar surface 150 may be displaced or offset from the center point 158 of the first planar surface 148 in a direction that is generally perpendicular to a longitudinal axis 164 of the tower 102.

Thus, in accordance with several embodiments of the present subject matter, the longitudinal axis 156 of the root extender 130 may be angled in a direction towards the tower 102 such the center point 160 of the second planar surface 150 is positioned closer to the tower 102 than the center point 158 of the first planar surface 148. For instance, as shown in FIG. 4, the center point 160 of the second planar surface 150 may be displaced or offset by a distance 168 from the center point 158 of the first planar surface 148. Accordingly, when the rotor blade 112 is coupled to the second end 136 of the root extender 130, a center of gravity 170 of the rotor blade 112 may be generally aligned with the pitch axis 124 (and/or the center point 158 of the first planar surface 158). In particular, by offsetting or displacing the center point 160 of the second planar surface 150 in the direction of the tower 102, the root extender 130 may be configured to accommodate the shift in the center of gravity 170 that occurs when the rotor blade 112 is angled away from the tower 102 (due to the cone angle 152 of the second planar surface 150). As a result, the loads acting on the pitch drive(s) 126 and/or the pitch bearing(s) 138 may be reduced significantly.

It should be appreciated that the distance 168 at which the center point 160 of the second planar surface 150 is displaced from the center point 148 of the first planar surface 148 may generally vary depending on the height 146 of the root extender 130, the displacement angle 162, the cone angle 152, the spanwise length defined between the blade root 114 and the center of gravity 170 and/or various other suitable parameters. For example, assuming similar configurations between the disclosed root extender 130 and the conventional root extender 12 shown in FIG. 1, the distance 168 between the center points 158, 160 of the first and second planar surfaces 146, 150 may generally correspond to the distance 36 defined between the pitch axis 26 and the center of gravity 34 of the rotor blade 16 shown in FIG. 1. This distance 168 may, in several embodiments, range from greater than 0 meters (m) to about 3 m, such as from about 0.25 m to about 2 m or from about 0.5 m to about 1 m and all other subranges therebetween. However, it is foreseeable that, in other embodiments, the distance 168 may be greater than about 3 m.

Figure 5:
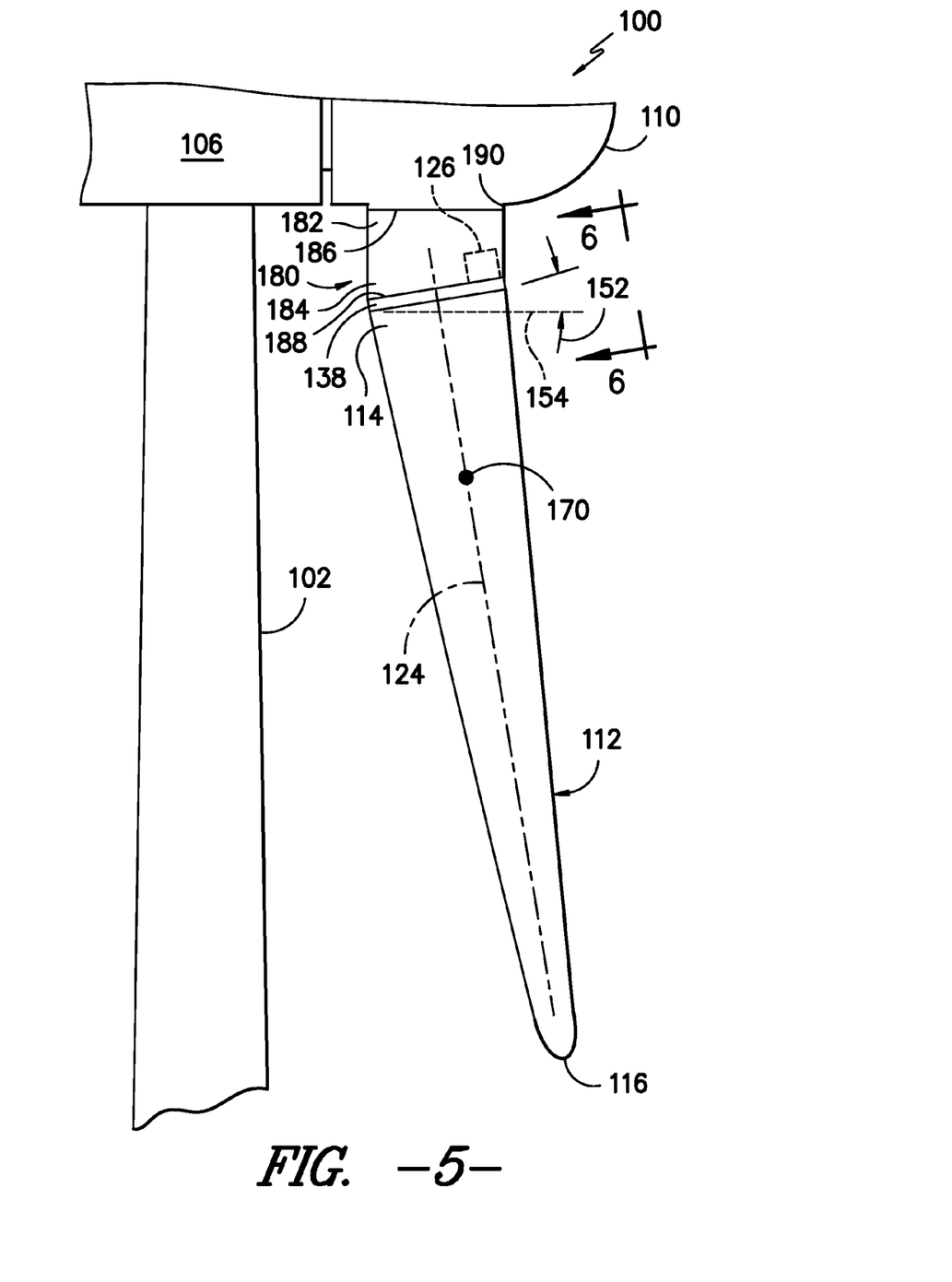
FIG. 5 illustrates a partial, side view of the wind turbine shown in FIG. 2, particularly illustrating one embodiment of a rotor blade configuration that may be advantageously used with a coned root extender.
Figure 6:
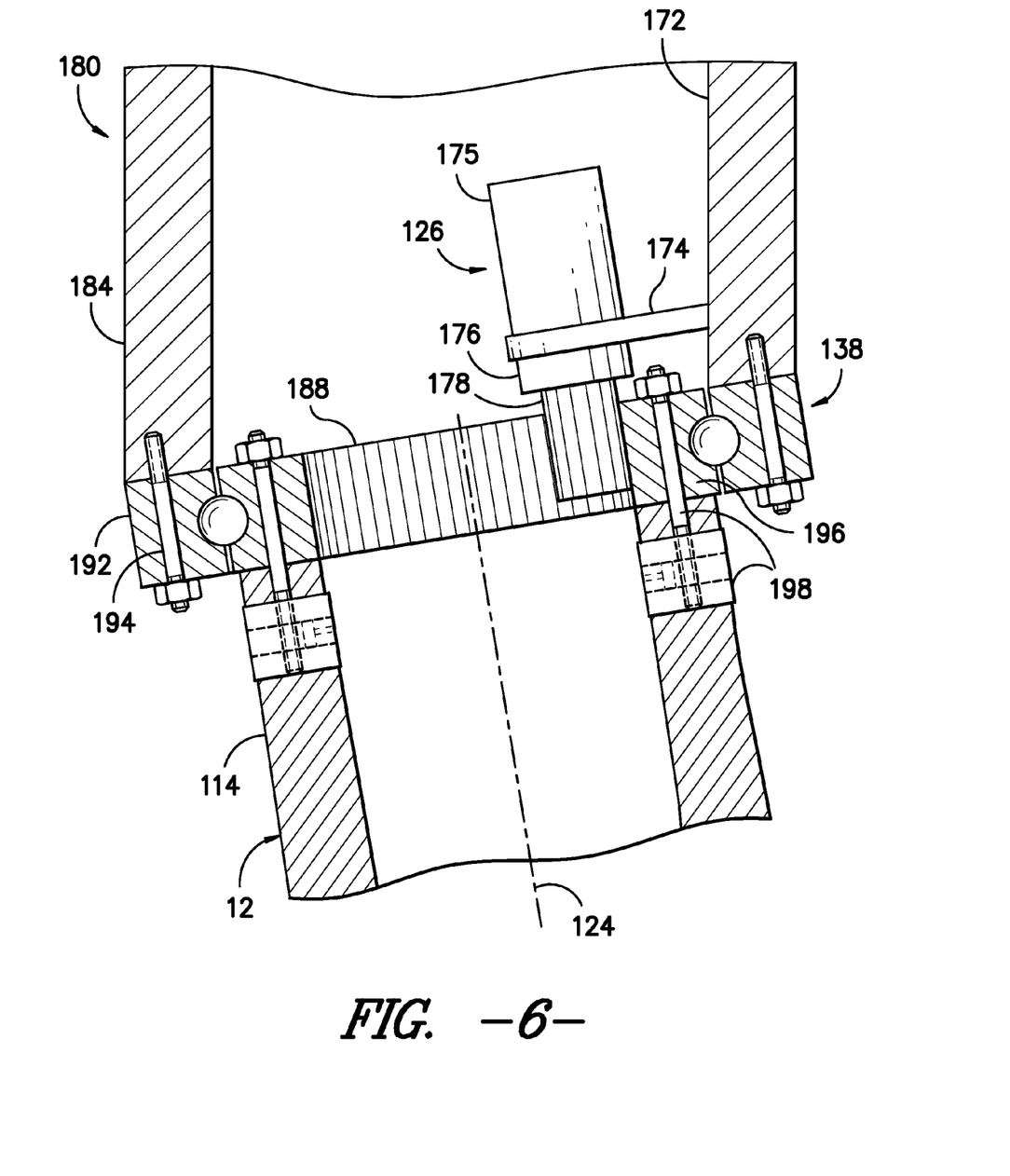
FIG. 6 illustrates a cross-sectional view of the rotor blade and the root extender shown in FIG. 5 taken about line 6-6.

Referring now to FIGS. 5 and 6, one embodiment of a wind turbine 100 having a rotor blade configuration that allows for the use of a coned root extender 180 without offsetting the center of gravity 170 of the rotor blade 112 relative to its pitch axis 124 is illustrated in accordance with aspects of the present subject matter. In particular, FIG. 5 illustrates a partial, side view of the wind turbine 100 having the root extender 180 installed between the hub 110 and one of the rotor blades 112 of the wind turbine 100. In addition, FIG. 6 illustrates a cross-sectional view of the root extender 180 and the rotor blade 112 shown in FIG. 5 taken about line 6-6.

As shown in the illustrated embodiment, the root extender 180 may generally be configured similar to the conventional root extender 12 described above with reference to FIG. 1. For example, the root extender 180 may generally extend lengthwise between a first end 182 and a second end 184, with the first end 182 being configured to be coupled to the hub 110 and the second end 184 being configured to be coupled to a blade root 114 of the rotor blade 112. In addition, the root extender 180 may define a first planar surface 186 at its first end 182 and a second planar surface 188 at its second end 184, with the second planar surface 188 being oriented at a cone angle 152 relative to the first planar surface 186. For instance, as described above, the cone angle 152 may be defined between the second planar surface 188 and a reference line 154 extending parallel to the first planar surface 186. As such, when the rotor blade 112 is coupled to the second end 184 of the root extender 180, the rotor blade 112 may be angled away 102 from the tower, thereby increasing the amount clearance defined between the tower 102 and the blade tip 116.

However, unlike the configuration described above with reference to FIG. 1, the pitch bearing 138 of the wind turbine 100 is positioned between the root extender 180 and the rotor blade 112. Specifically, as shown in FIGS. 5 and 6, instead of being disposed at the interface defined between the first end 182 of the root extender 180 and the hub 110, the pitch bearing 138 may be disposed at the interface defined between the second end 184 of the root extender 180 and the blade root 114. As such, the pitch axis 124 of the rotor blade 112 may extend generally perpendicular to the second planar surface 188 of the root extender 180 (i.e., generally parallel to the span of the rotor blade 112), thereby aligning the pitch axis 124 with the center of gravity 170 of the rotor blade 112.

As shown in FIGS. 5 and 6, in several embodiments, the first end 182 of the root extender 180 may be configured to be coupled directly to a portion of the hub 110. For instance, in one embodiment, the first end 182 may be coupled to a blade flange 190 of the hub 110 using any suitable mechanical fasteners (e.g., bolts, screws, pins and/or the like). Similarly, the second end 184 of the root extender 180 may be configured to be coupled to a portion of the pitch bearing 138. For example, as particularly shown in FIG. 6, in one embodiment, the second end 184 may be coupled to an outer bearing race 192 of the pitch bearing 138 using suitable fasteners 194 (e.g., bolts, screws, pins and/or the like). In such an embodiment, the blade root 114 of the rotor blade 112 may be configured to be coupled to an inner bearing race 196 of the pitch bearing 138 using suitable fasteners 198 (e.g., a combination of bolts and barrel nuts and/or any other suitable fasteners)

In addition, the pitch drive(s) 126 of the wind turbine 100 may also be moved from within the hub 110 to a location within the root extender 180. For example, as shown in FIG. 6, the pitch drive(s) 126 may be mounted to an inner surface 172 of the root extender 180 (e.g., using a bracket and/or any other suitable coupling 174) at any suitable location that permits the pitch drive(s) 126 to engage the inner bearing race 196 of the pitch bearing 138. As such, the inner bearing race 196 may be rotated relative to the outer bearing race 192, thereby rotating the rotor blade 112 relative to the root extender 180 about its pitch axis 124.

It should be readily appreciated that the pitch drive(s) 126 may generally include any suitable components and may have any suitable configuration that allows the pitch drive(s) 126 to function as described herein. For example, as shown in FIG. 6, the pitch drive(s) 126 may include a pitch drive motor 175 (e.g., any suitable electric motor), a pitch drive gearbox 176, and a pitch drive pinion 178. In such an embodiment, the pitch drive motor 175 may be coupled to the pitch drive gearbox 176 so that the pitch drive motor 175 imparts mechanical force to the pitch drive gearbox 176. Similarly, the pitch drive gearbox 176 may be coupled to the pitch drive pinion 178 for rotation therewith. The pitch drive pinion 178 may, in turn, be in rotational engagement with the inner bearing race 196 (e.g., via a gear mesh) such that rotation of the pitch drive pinion 178 results in rotation of the inner bearing race 196 relative to the outer bearing race 192 and, thus, rotation of the rotor blade 112 about its pitch axis 124.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A root extender for coupling a rotor blade to a hub of a wind turbine, the root extender comprising:
   a body defining a longitudinal axis between a first end and a second end, the first end defining a first planar surface configured to be positioned adjacent to the hub and the second end defining a second planar surface configured to be positioned adjacent to the rotor blade, the second planar surface being oriented at a cone angle relative to the first planar surface, the longitudinal axis extending between a center of the first planar surface and a center of the second planar surface,
   wherein the longitudinal axis is oriented at a non-perpendicular angle relative to the first planar surface such that the center of the second planar surface is displaced relative to the center of the first planar surface in a direction perpendicular to a longitudinal axis of a tower of the wind turbine when the body is coupled between the hub and the rotor blade.

2. The root extender of claim 1, wherein the center of the second planar surface is displaced relative to the center of the first planar surface in a direction towards the tower.

3. The root extender of claim 1, wherein the center of the second planar surface is displaced relative to the center of the first planar surface by a distance that is greater than 0 meters and less than about 3 meters.

4. The root extender of claim 1, wherein the cone angle is greater than 0 degrees and less than about 10 degrees.

5. A wind turbine, comprising:
a tower;
a nacelle mounted on the tower;
a rotor coupled to the nacelle, the rotor including a hub and a rotor blade rotatable about a pitch axis; and
a root extender coupled between the hub and the rotor blade, the root extender defining a longitudinal axis between a first end and a second end, the first end defining a first planar surface positioned adjacent to the hub and the second end defining a second planar surface positioned adjacent to the rotor blade, the second planar surface being oriented at a cone angle relative to the first planar surface,
wherein the longitudinal axis of the root extender is oriented at a non-perpendicular angle relative to the first planar surface such that the body is angled in a direction towards the tower.

6. The wind turbine of claim 5, wherein the longitudinal axis of the root extender extends between a center of the first planar surface and a center of the second planar surface.

7. The wind turbine of claim 5, wherein the center of the second planar surface is displaced relative to the center of the first planar surface in a direction perpendicular to a longitudinal axis of the tower.

8. The wind turbine of claim 7, wherein the center of the second planar surface is displaced relative to the center of the first planar surface by a distance that is greater than 0 meters and less than about 3 meters.

9. The wind turbine of claim 5, wherein the cone angle is greater than 0 degrees and less than about 10 degrees.

10. The wind turbine of claim 5, wherein the rotor blade defines a center of gravity, the center of gravity being generally aligned with the pitch axis.

11. A wind turbine, comprising
a tower;
a nacelle mounted on the tower;
a rotor coupled to the nacelle, the rotor including a hub and a rotor blade rotatable about a pitch axis; and
a root extender extending between a first end coupled to the hub and a second end coupled to the rotor blade, the first end defining a first planar surface and the second end defining a second planar surface, the second planar surface being oriented at a cone angle relative to the first planar surface,
wherein the rotor blade extends from the root extender such that a center of gravity of the rotor blade is aligned with the pitch axis.

12. The wind turbine of claim 11, further comprising a pitch bearing disposed between the second end of the root extender and a blade root of the rotor blade.

13. The wind turbine of claim 12, wherein the pitch bearing comprises an outer bearing race and an inner bearing race, the outer bearing race being coupled to the second end of the root extender and the inner bearing race being coupled to the blade root of the rotor blade.

14. The wind turbine of claim 12, further comprising a pitch drive positioned within the root extender, the pitch drive being configured to engage the pitch bearing such that the rotor blade is rotated relative to the root extender about the pitch axis.

15. The wind turbine of claim 11, wherein the cone angle is greater than 0 degrees and less than about 10 degrees.

* * * * *